(12) United States Patent
Wang et al.

(10) Patent No.: US 11,748,894 B2
(45) Date of Patent: Sep. 5, 2023

(54) VIDEO STABILIZATION METHOD AND APPARATUS AND NON-TRANSITORY COMPUTER-READABLE MEDIUM

(71) Applicants: Yiwei Wang, Beijing (CN); Liyan Liu, Beijing (CN); Wei Wang, Beijing (CN)

(72) Inventors: Yiwei Wang, Beijing (CN); Liyan Liu, Beijing (CN); Wei Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 421 days.

(21) Appl. No.: 17/051,602

(22) PCT Filed: May 9, 2019

(86) PCT No.: PCT/JP2019/018626
§ 371 (c)(1),
(2) Date: Oct. 29, 2020

(87) PCT Pub. No.: WO2019/221013
PCT Pub. Date: Nov. 21, 2019

(65) Prior Publication Data
US 2021/0227139 A1    Jul. 22, 2021

(30) Foreign Application Priority Data
May 15, 2018 (CN) .......................... 201810461379.4

(51) Int. Cl.
*G06T 7/246* (2017.01)
*G06V 10/74* (2022.01)
*G06V 10/46* (2022.01)

(52) U.S. Cl.
CPC .............. *G06T 7/246* (2017.01); *G06T 7/248* (2017.01); *G06V 10/74* (2022.01); *G06V 10/462* (2022.01)

(58) Field of Classification Search
CPC ......... G06T 7/246; G06T 7/248; G06V 10/74; G06V 10/462
See application file for complete search history.

(56) References Cited

U.S. PATENT DOCUMENTS 7,139,423 B1 * 11/2006 Nicolas .................. G06T 7/579
382/106
9,053,366 B2 * 6/2015 Us .......................... H04N 19/48
(Continued)

FOREIGN PATENT DOCUMENTS

| CN | 103079037 A | 5/2013 |
| CN | 107730881 A | 2/2018 |
| WO | 2013/062742 A1 | 5/2013 |

OTHER PUBLICATIONS

International Search Report for PCT/JP2019/018626 dated Nov. 22, 2019.
(Continued)

*Primary Examiner* — Pinalben Patel
(74) *Attorney, Agent, or Firm* — Harness, Dickey & Pierce, P.L.C.

(57) ABSTRACT

Disclosed is a video stabilization method including steps of selecting a first area in a first image; determining at least one first feature point based on the first area, and performing feature point matching on the first image and a second image so as to obtain at least one feature point matching pair between the first image and the second image, each feature point matching pair including a first feature point of the first image and a second feature point of the second image; conducting motion parameter estimation based on the at least one feature point matching pair so as to obtain a motion parameter; and carrying out motion compensation with respect to the first image based on the motion parameter so as to acquire a first stable image after compensation.

19 Claims, 7 Drawing Sheets

(56) References Cited

U.S. PATENT DOCUMENTS

| | | |
|---|---|---|
| 9,552,514 B2 | 1/2017 | Zhao et al. |
| 9,600,898 B2 | 3/2017 | Liu et al. |
| 10,074,010 B2 | 9/2018 | Chen et al. |
| 10,674,086 B2 | 6/2020 | Wang et al. |
| 2009/0096879 A1 | 4/2009 | Motomura et al. |
| 2012/0281922 A1* | 11/2012 | Yamada ................ H04N 23/68 |
| | | 382/201 |
| 2013/0121597 A1 | 5/2013 | Hsu |
| 2013/0322697 A1* | 12/2013 | Grindstaff .............. G06T 7/246 |
| | | 382/107 |
| 2015/0104067 A1 | 4/2015 | Liu |
| 2017/0126977 A1 | 5/2017 | Klivington et al. |
| 2017/0308998 A1* | 10/2017 | Wang .................... H04N 19/54 |
| 2018/0070013 A1 | 3/2018 | Schlattmann et al. |
| 2020/0058129 A1* | 2/2020 | Guo ....................... G06F 18/22 |
| 2021/0400229 A1* | 12/2021 | Chen ..................... G06V 20/40 |

OTHER PUBLICATIONS

Chinese Office Action dated Apr. 6, 2021 issued in corresponding Chinese Appln. No. 201810461379.4, with English translation.

* cited by examiner

[Fig. 1]
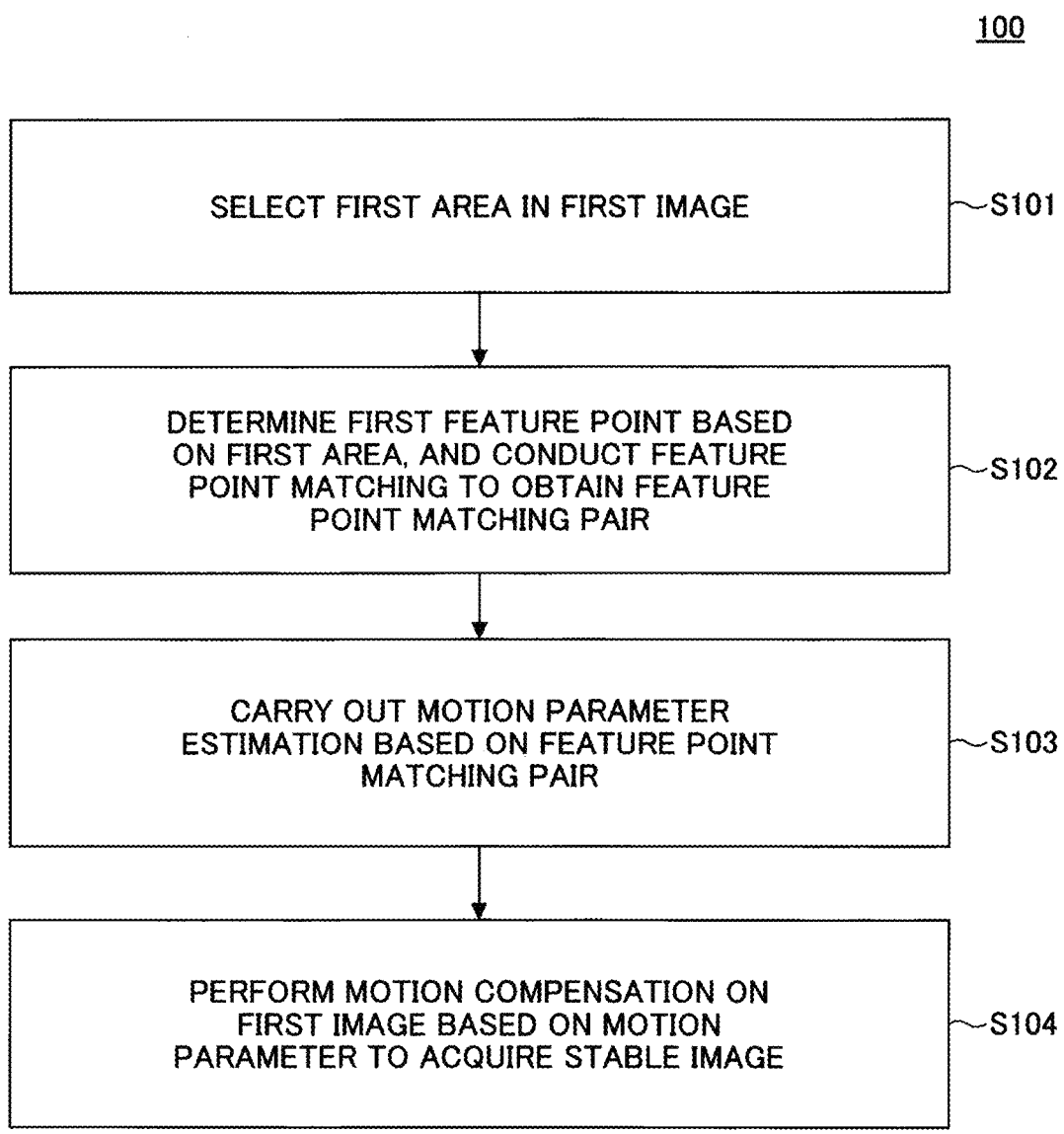

[Fig. 2A]
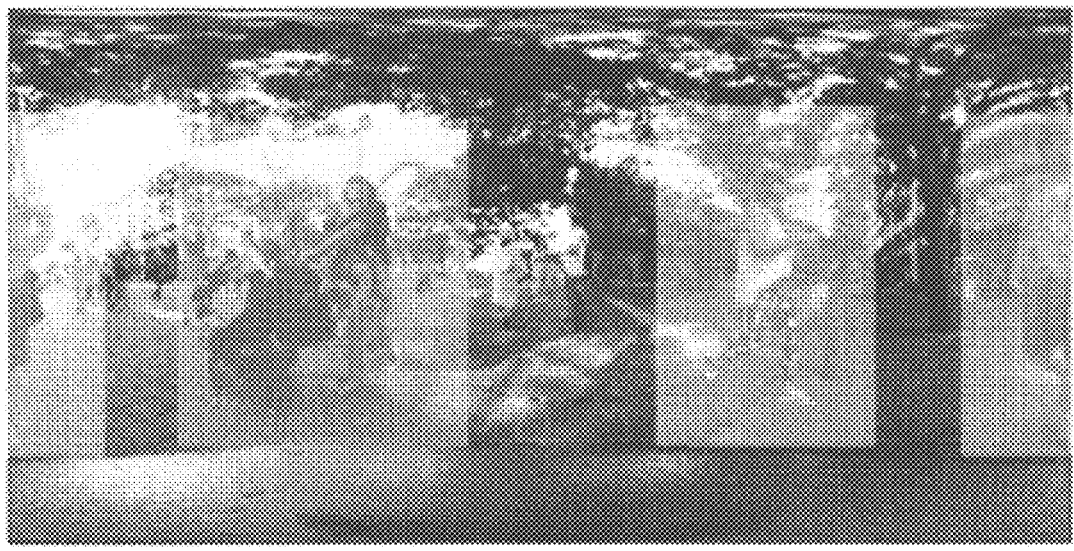

[Fig. 2B]
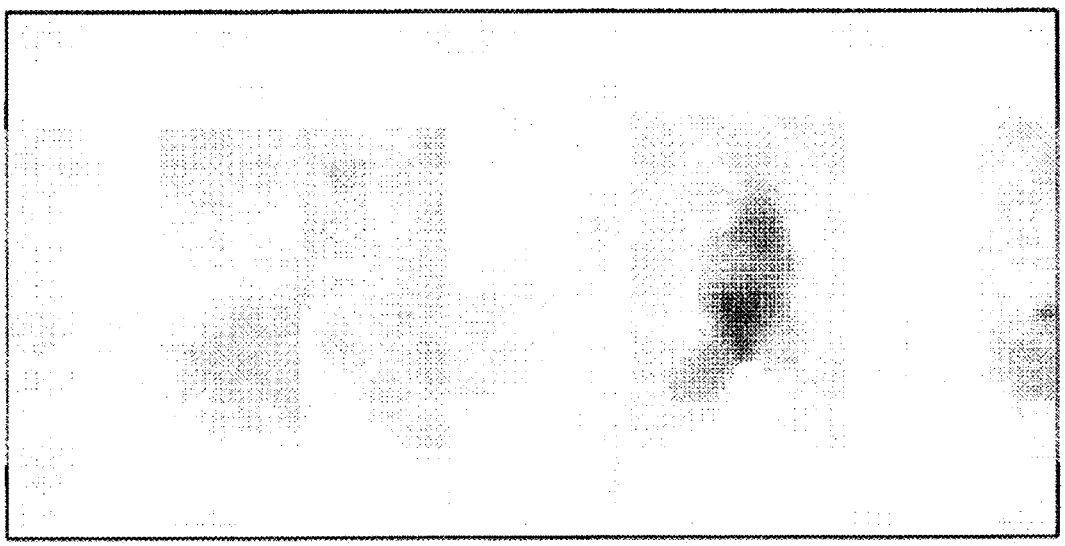

[Fig. 3A]
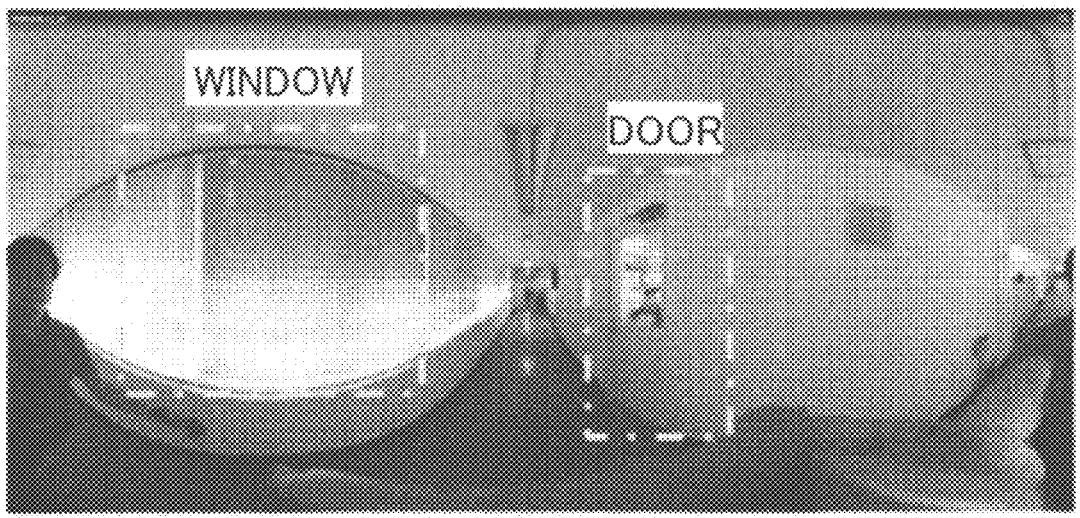
[Fig. 3B]
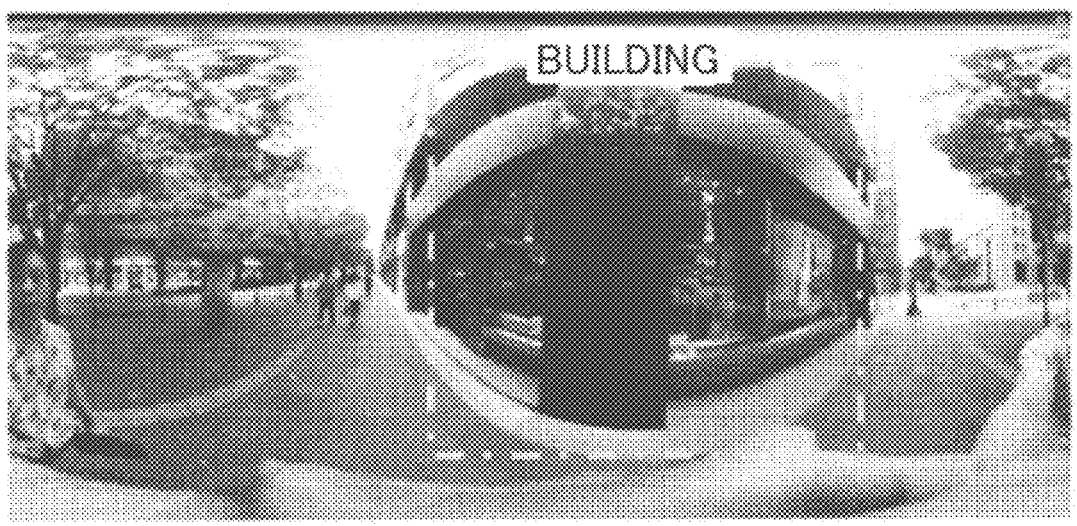

[Fig. 4]
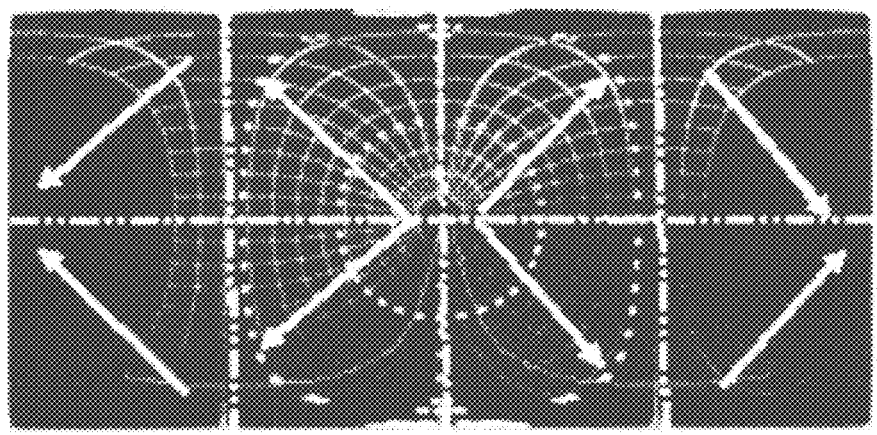

[Fig. 5]
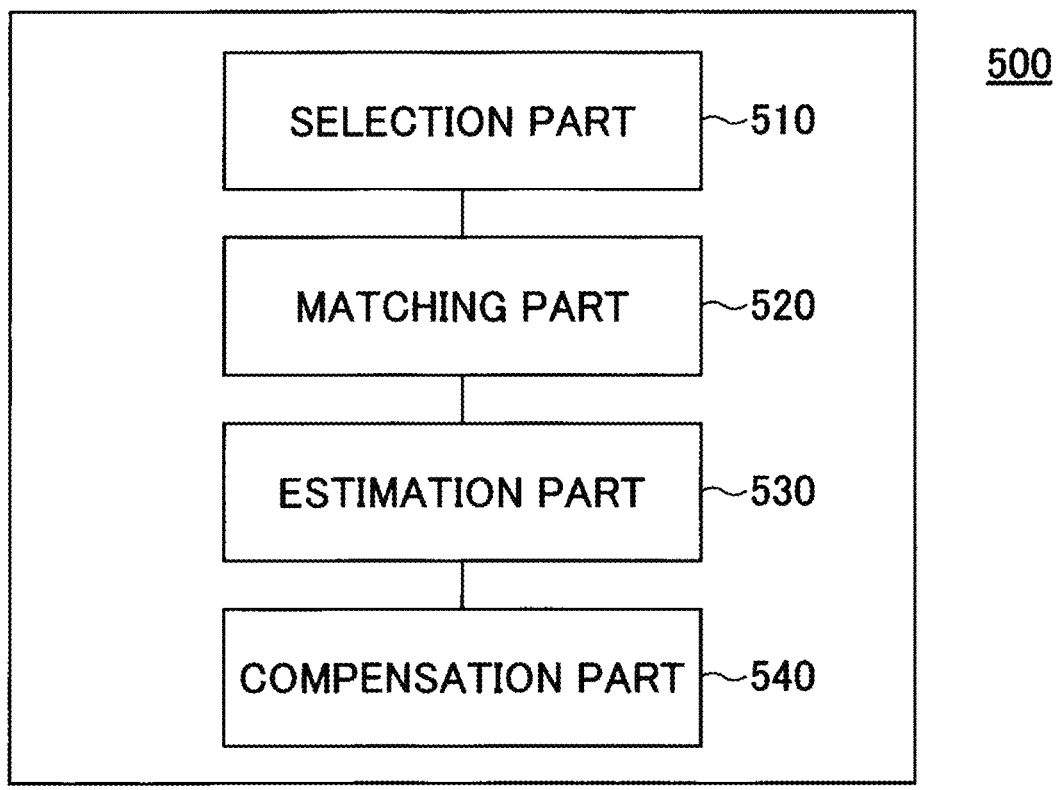

[Fig. 6]
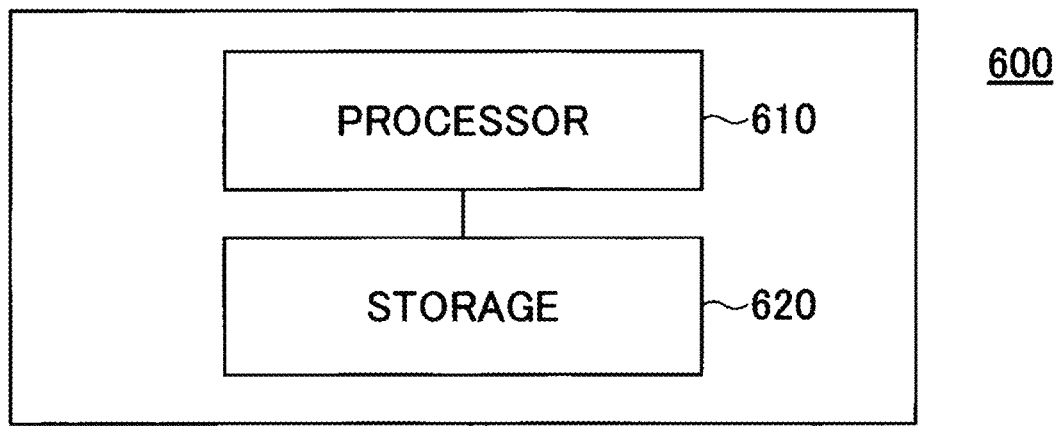

VIDEO STABILIZATION METHOD AND APPARATUS AND NON-TRANSITORY COMPUTER-READABLE MEDIUM

CROSS-REFERENCE TO RELATED APPLICATIONS

This application is a national phase under 35 U.S.C. § 371 of PCT International Application No. PCT/JP2019/018626 which has an International filing date of May 9, 2019, which claims priority to China Patent Application No. 201810461379.4, filed May 15, 2018, the entire contents of each of which are hereby incorporated by reference.

TECHNICAL FIELD

The present invention relates to the field of image processing, and especially relates to a video stabilization method and apparatus as well as a non-transitory computer-readable medium and a computer program.

BACKGROUND ART

Video stabilization methods are mainly used for removing disturbance on an imaging system, a sighting system, a positioning system, etc. In particular, the video stabilization methods may be roughly divided into two classes, namely, sensor based video stabilization methods and algorithm based video stabilization methods. A typical algorithm based video stabilization method usually includes steps of motion estimation, motion smoothing, and motion compensation. By conducting these steps, it is possible to grasp motion deviation of a camera so as to eliminate the motion deviation when outputting a video captured by the camera. In this way, a more stable image sequence (i.e., a video) may be displayed; that is, its output quality may be improved.

However, an algorithm based video stabilization method in the conventional techniques often involves the motion states of all the objects in an image (also called a "frame", "video image", or "video frame") taken by a camera when performing motion estimation. If the motion state of a moving object at an actual scene is contained in the image, it may result in interference with the calculation result of video stabilization, thereby reducing disturbance removal effect and video quality.

SUMMARY OF INVENTION

Technical Problem

The aim of the present invention is to provide a video stabilization method and apparatus as well as a non-transitory computer-readable medium and a computer program so as to solve the above-described technical problems.

Solution to Problem

According to a first aspect of the present invention, a video stabilization method is provided which includes steps of selecting a first area in a first image; determining one or more first feature points based on the first area selected, and conducting feature point matching with respect to the first image and a second image so as to obtain at least one feature point matching pair between the first image and the second image, each feature point matching pair being inclusive of a first feature point of the first image and a second feature point of the second image; carrying out motion parameter estimation based on the at least one feature point matching pair obtained; and performing motion compensation on the first image based on the estimated motion parameter so as to acquire a first stable image compensated.

According to a second aspect of the present invention, a video stabilization apparatus is provided which includes a selection part configured to select a first area in a first image; a matching part configured to determine one or more first feature points based on the first area selected, and conduct feature point matching with respect to the first image and a second image so as to obtain at least one feature point matching pair between the first image and the second image, each feature point matching pair being inclusive of a first feature point of the first image and a second feature point of the second image; an estimation part configured to carry out motion parameter estimation based on the at least one feature point matching pair obtained; and a compensation part configured to perform motion compensation on the first image based on the estimated motion parameter so as to acquire a first stable image after compensation.

According to a third aspect of the present invention, a video stabilization apparatus is provided which includes a storage in which computer-executable instructions are stored and a processor connected to the storage. The computer-executable instructions, when executed by the processor, cause the processor to implement steps of selecting a first area in a first image; determining one or more first feature points based on the first area selected, and conducting feature point matching with respect to the first image and a second image so as to obtain at least one feature point matching pair between the first image and the second image, each feature point matching pair being inclusive of a first feature point of the first image and a second feature point of the second image; carrying out motion parameter estimation based on the at least one feature point matching pair obtained; and performing motion compensation on the first image based on the estimated motion parameters so as to acquire a first stable image compensated.

According to a fourth aspect of the present invention, a non-transitory computer-readable medium is provided in which computer-executable instructions are stored. The computer-executable instructions, when executed by a processor, cause the processor to achieve steps of selecting a first area in a first image; determining one or more first feature points based on the first area selected, and conducting feature point matching with respect to the first image and a second image so as to obtain at least one feature point matching pair between the first image and the second image, each feature point matching pair being inclusive of a first feature point of the first image and a second feature point of the second image; carrying out motion parameter estimation based on the at least one feature point matching pair obtained; and performing motion compensation on the first image based on the estimated motion parameters so as to acquire a first stable image compensated.

According to a fifth aspect of the present invention, a computer program is provided which may cause a processor to accomplish steps of selecting a first area in a first image; determining one or more first feature points based on the first area selected, and conducting feature point matching with respect to the first image and a second image so as to obtain at least one feature point matching pair between the first image and the second image, each feature point matching pair being inclusive of a first feature point of the first image and a second feature point of the second image; carrying out motion parameter estimation based on the at least one feature point matching pair obtained; and performing motion compensation on the first image based on the estimated motion parameters so as to acquire a first stable image after compensation.

Advantageous Effects of Invention

By the present invention, it is possible to avoid the interference, of a scene area in a video image able to influence a video stabilization algorithm, with image compensation, so as to ameliorate the output quality of the related video.

BRIEF DESCRIPTION OF DRAWINGS

FIG. 1 is a flowchart of a video stabilization method according to a first embodiment of the present invention.

FIG. 2A illustrates a first image used in the first embodiment of the present invention.

FIG. 2B illustrates optical flow calculation performed on the first image shown in FIG. 2A.

FIG. 3A illustrates an object detection result obtained in the first embodiment of the present invention.

FIG. 3B illustrates another object detection result acquired in the first embodiment of the present invention.

FIG. 4 illustrates the theoretical motion directions of different portions in an equirectangular image obtained by conducting projection with respect to a three dimensional image captured by a panoramic camera.

FIG. 5 is a block diagram of a video stabilization apparatus according to a second embodiment of the present invention.

FIG. 6 is a block diagram of another video stabilization apparatus according to a third embodiment of the present invention.

DESCRIPTION OF EMBODIMENTS

In order to let a person skilled in the art better understand the present invention, hereinafter, the embodiments of the present invention will be concretely described with reference to the drawings. However, it should be noted that the same symbols, which are in the specification and the drawings, stand for constructional elements having basically the same function and structure, and the repetition of the explanations to the constructional elements is omitted.

In the embodiments of the present invention, for the purpose of overcoming a problem that the accuracy of feature point matching and motion estimation in the conventional techniques is not sufficient, a video image is divided into areas in the process of video stabilization, and feature point matching as well as the follow-on motion estimation and motion compensation are conducted on the basis of the areas divided. In this manner, it is possible to make the output quality of a video better.

First Embodiment

FIG. 1 is a flowchart of a video stabilization method according to this embodiment.

Here it should be noted that the video stabilization method may be applied to not only a two dimensional image photographed by an ordinary camera but also a three dimensional image taken by a panoramic camera, and the present invention is not limited to this.

As shown in FIG. 1, in STEP S101, a first area in a first image is selected.

Considering that motion estimation including a moving object in an image and motion compensation for the whole image may engender excess compensation for a static object in the image, in order to avoid as much as possible interference of a scene area (e.g., an area in which a moving object is located) in the image with video stabilization, area selection may be performed on a first image waiting for video stabilization so as to obtain one or more first areas in this step.

As an option, the first image may be a current frame among video images collected; certainly it may also be any frame therein. Moreover, it is possible to capture the first image, a second image set forth below, and the like by a photographing part provided on a mobile robot, an intelligent vehicle, a drone, etc. The photographing part may be a single lens camera or a video camera; surely it may also be a two-lens or multi-lens camera or a video camera.

In an example, if a video image is a two dimensional image, then it is possible to directly choose a first area therein. In another example, if a video image is a three dimensional image, then a two dimensional image (e.g., a longitude-and-latitude image) may be attained by conducting coordinate transform in regard to the video image, and then, a first area in the two dimensional image may be chosen.

Additionally, in an example, the first area selected from the first image may include one or more first areas in which pixels have a first state. The first state is a non-motion state which may be inclusive of a still state and a state where ?the instantaneous movement speed of a pixel is less than a predetermined threshold.

In particular, it is possible to select a first area in the first image on the basis of the optical flow values of the first image. Generally speaking, optical flow may be used to express the motion information of all the pixels in an image, and the related optical flow field may be indicative of an instantaneous movement speed field formed by all the pixels in the image. Thus, for the purpose of determining a first area in the first image containing pixels in the non-motion state, it is possible to calculate the optical flow value of each pixel in the first image, and then, take an area therein, in which the optical flow values of pixels are less than a predetermined threshold, as the first area. Here, the predetermined threshold may be acquired by computing the average optical flow value of the whole first image.

FIG. 2A illustrates a first image, and FIG. 2B illustrates optical flow calculation performed on the first image shown in FIG. 2A.

It can be seen from FIGS. 2A and 2B that the optical flow values of the pixels corresponding to the relatively stationary objects in the first image such as trees, persons at the center, and so on are relatively small (in FIG. 2B, the color of these kinds of objects is relatively light), whereas, the optical flow values of the pixels corresponding to the relatively moving objects in the first image such as pedestrians pushing baby cars, running persons, and so forth are relatively large (in FIG. 2B, the color of these types of objects is relatively dark). On this account, by using the optical flow values, it is possible to remove the relatively moving objects in the first image from the follow-on feature point matching and motion estimation steps so as to increase the accuracy of video stabilization.

For instance, in FIG. 2B, areas in each of which a specific optical flow value (e.g., an average optical flow value) exceeds a predetermined threshold may be selected by rectangles, and then, by subtracting the selected areas from FIG. 2A, it is possible to let the remaining area serve as a first area of the first image. It is clear that instead of the rectangles, it is also possible to utilize pixels or pixel groups to carry out the same processing in actuality.

Furthermore, in another example, an artificial intelligence (AI) based approach, for example, deep learning, may be adopted to perform object detection on the first image and garner a first area therein on the basis of the object detection result. In this example, selecting the first area in the first image may include conducting object detection in regard to the first image and choosing at least one first area based on the type of at least one object detected in the first image. Here, each first area has a corresponding weight value.

As an illustration, by performing object detection on the first image, it is possible to acquire a plurality of types of objects. Then, on the basis of different types of objects, different weight values may be given to different first areas where different objects with different types are located.

FIGS. 3A and 3B illustrate exemplary results attained after carrying out the above-described object detection process, respectively.

The detected objects shown in FIG. 3A are a window and a door, and the detected object presented in FIG. 3B is a building. Of course, what FIGS. 3A and 3B present is just for illustration. Actually it is also possible to detect various types of objects such as persons, vehicles, animals, trees, sky, roads, tables, chairs, and the like on the grounds of different scenes to which the first image corresponds. After objects and their types in the first image are determined, different first areas in which different types of objects are located may be selected. In addition, different weight values may be provided to different first areas according to different object types.

For example, a first area in which a relatively stationary object is located may be given a relatively high weight value, whereas a first area where a relatively moving object is located may be assigned a relatively low weight value. In particular, it is possible to give a weight value 0.9 to a first area in which sky, a building, a door, a window, a table, or a chair is located, and provide a weight value 0.1 to a first area where a person, a vehicle, or an animal is located. Of course, the above-depicted object detection and weight value assignment approaches are merely examples. In actuality, any other object detection and weight value assignment approaches may be adopted in this embodiment.

Referring again to FIG. 1; in STEP S102, one or more first feature points are determined based on the first area selected from the first image, and feature point matching is carried out pertaining to the first image and a second image so as to gain at least one feature point matching pair between the first and second images. Here, each feature point matching pair contains a first feature point of the first image and a second feature point of the second image.

In this step, it is possible to adopt different means to determine the first feature points in accordance with different ways and criteria for choosing the first area in the first image. As an example, after a first area in the first image having pixels in the non-motion state is selected, feature point detection may be performed on the first area, and the detected feature points may serve as the first feature points used for conducting feature point matching. Particularly, if the optical flow based approach is utilized to choose the first area from the first image, it is possible to carry out feature point detection regarding only the first area chosen. This is equal to giving a weight value 1 to the first area chosen, and selecting all the feature points (100% of the feature points) therein as the first feature points for conducting feature point matching with a corresponding area in a second image so as to acquire at least one feature point pair.

Accordingly a second area in the second image may be chosen in a manner similar to the way for selecting the first area from the first image. For example, it is also possible to make use of the optical flow based approach to perform feature point detection on a second area selected from the second image, having pixels in the non-motion state, and take advantage of, after the feature points in the first and second areas are determined, the first feature points in the first image and the second feature points in the second image to conduct feature point matching so as to attain at least one feature point matching pair.

Here it should be noted that such a selection mode is just an illustration. In another case, it is also possible to respectively choose a certain number or proportion of feature points from the first area and an unspecified area in the first image as the first feature points for carrying out feature point matching with their corresponding second feature points in the second image.

Alternatively, after selecting one or more first areas with different weight values from the first image by adopting object detection set forth above, it is possible to let one or more (or at least a part of) feature points detected be the first feature points for conducting feature point matching according to the weight values corresponding to the first areas. For example, if it is determined that there are sky, a building, a tree, and a person in a first image, then areas therein where these types of objects are respectively located may serve as first areas. Subsequently the first areas corresponding to the sky and the building may be assigned a predetermined weight value 1; the first area corresponding to the tree may be given a predetermined weight value 0.9; and the first area corresponding to the person may be provided a predetermined weight value 0.1.

In this case, the weight values may serve as ratios for choosing one or more first feature points in the respective first areas. That is, it is possible to select one or more feature points from each of the first areas based on the ratio corresponding to the same first area to be one or more first feature points. Particularly, all the feature points (i.e., 100% of the feature points) in the first areas where the sky and the building are respectively located may be selected as first feature points because their corresponding ratio (weight value) is 1; 90% of the feature points in the first area at which the tree is located may be chosen as first feature points because its corresponding ratio (weight value) is 0.9; and 10% of the feature points in the first area where the person is located may be selected as first feature points because the corresponding ratio (weight value) is 0.1. Here it should be noted that this embodiment is not limited to this. For instance, it is also possible to select at least one first feature point in a first image according to a predetermined rule.

Moreover, in an example, one or more second areas in the second image may be selected in a manner similar to the way for choosing the first area from the first image, as described above. After the second areas of the second image are procured, it is possible to establish a correspondence between each of the second areas and the corresponding first area of the first image, and carry out feature point detection, matching, etc. on the grounds of the second areas.

For instance, if it is determined that feature point detection is conducted with respect to only a first area of the first image, and all the detected feature points serve as first feature points for performing feature point matching, then feature point detection may be carried out in regard to a second area of the second image corresponding to the first area of the first image, and all the detected feature points may act as second feature points for conducting feature point matching. Alternatively, if it is determined that a certain number or proportion of feature points are selected from a first area in the first image to serve as first feature points, then the same number or proportion of feature points may be chosen from a second area in the second image corresponding to the first area in the first image to act as second feature points. Optionally, on the basis of this, it is also possible to carry out area division and selection pertaining to a part of a video or all the frames of the video, and then, perform feature point detection and feature point matching between different frames.

In this embodiment, feature point detection may be achieved by a SIFT (Scale Invariant Feature Transform), SURF (Speeded UP Robust Features), Harris Corner, or ORB (Oriented FAST and Rotated BRIEF) based algorithm. After feature point detection is implemented, as an option, the detected feature points may be described by various feature description approaches using grayscale features, gradient features, disparity information, etc.

Additionally, feature point matching between the first and second images may be realized by a GMS (Grid-based Motion Statistics) based algorithm, for example. The aim of conducting feature point matching is to remove some erroneous or mismatched feature points by determining whether the feature point matching results are correct, so as to acquire suitable feature points and the related feature point matching pairs. In this way, it is possible to improve the stability of feature point matching. As an illustration, an approach based on motion consistency may be utilized for eliminating mistaken feature point matching pairs.

FIG. 4 illustrates the theoretical motion directions of different portions in an equirectangular image obtained by carrying out projection with regard to a three dimensional image acquired by a panoramic camera.

In the case shown in FIG. 4, the three dimensional image is obtained in a manner of letting the panoramic camera move parallel to the surface of the ground. As the panoramic camera moves, the pixels in the different portions of the equirectangular image move along different directions. In other words, when feature point matching is performed on a first image and a second image obtained at a scene as shown in FIG. 4, on the basis of the interval between the capture time points of the two images as well as the consistency between the actual motion directions of the feature points in the feature point matching pairs attained and the theoretical motion directions as presented in FIG. 4, mistaken feature point matching pairs may be removed.

Hereinafter, an example is given for further explanation.

In this example, it is assumed that a first image and a second image are adjacent frames;

$\vec{v}$ stands for the actual motion direction of a feature point matching pair containing a first feature point of the first image and a second feature point of the second image, which may be expressed by the straight line passing through the two feature points, for example;

$\vec{V}$ refers to the theoretical motion direction of a position in FIG. 4 corresponding to the first or second feature point, which may be the tangential direction at the same position through which a curve passes, for instance; and a is the angle between $\vec{v}$ and $\vec{V}$.

Thus it is possible to obtain the following equation (1).

$$\cos\alpha = \frac{\vec{v} \cdot \vec{V}}{|\vec{v}||\vec{V}|} \quad (1)$$

The equation (1) may be used to select feature point matching pairs whose motion directions meet a predetermined condition. For example, if $$\cos\alpha \in \left[\frac{\sqrt{2}}{2}, 1\right]$$

then the related feature point matching pairs may remain; otherwise, they may be removed. Here it should be noted that the present invention is not limited to this. In actuality, any matching approach based on the consistency of motion directions may be adopted for carrying out feature point matching pair selection.

After conducting feature point matching, each of the acquired feature point matching pairs is inclusive of a first feature point of the first image and a second feature point of the second image. That is, each of the first feature points in the first image and the corresponding second feature point in the second image has a one-to-one relationship, and form a feature point matching pair.

Referring again to FIG. 1; in STEP S103, motion parameter estimation is performed on the grounds of the feature point matching pairs acquired.

After the feature point matching pairs respectively containing a first feature point of the first image and a second feature point of the second image are garnered, it is possible to carry out motion parameter estimation on the basis of them. For example, a RANSAC (Random Sample Consensus) based approach may be utilized for estimating the homography matrix between the first and second images.

As an option, the second image may be the immediately previous frame of the first image, i.e., the two are neighboring frames. In this case, when performing motion parameter estimation, only the acquired feature point matching pairs may be employed to estimate the homography matrix between the first and second images for the following-on motion compensation. Moreover, on the basis of this, the relative motion between the second image and a reference frame may further be utilized to estimate the motion parameter between the first image and the reference frame for the motion compensation between the two. Particularly, it is possible to first calculate the homography matrix between the first image and the frame (i.e., the second image) immediately prior to the first image, and then, compute in sequence the homography matrices of the second image relative to its previous frames (e.g., the number of frames between the second frame and each previous frame used may be a multiple of two) until arriving at the reference frame, so as to finally procure the homography matrix of the first image relative to the reference frame for motion compensation.

Alternatively, the second image may be a reference frame in a video. In this circumstance, it is possible to take advantage of the acquired feature point matching pairs to estimate the homography matrix between the first image and the second image (i.e., the reference image) to serve as the estimated motion parameter for the following-on motion compensation.

In other words, the obtained motion parameter may be the motion parameter of the first image relative to the second image or relative to a predetermined reference frame. This decides relative to which frame the motion compensation of the first image will be conducted in the following-on step.

Referring to FIG. 1 again; in STEP S104, motion compensation is performed on the first image according to the estimated motion parameter so as to attain a first stable image.

In this step, before carrying out motion compensation, it is also possible to conduct a smoothing process with respect to the estimated motion parameter, for example, the above-described homography matrix, by mean filtering, and then, utilize the smoothed motion parameter to perform motion compensation on the first image.

Concretely, for a given homography matrix $R_{origin}$, the Euler angles may be derived therefrom, and after a mean filtering based smoothing process is conducted on the Euler angles, the smoothed Euler angles may be expressed by the following equation (2).

$$\gamma_n^{smooth} = \gamma_n - \text{mean}(\gamma_{n-size}^{noise}, \gamma_{n-noise+1}^{noise}, \ldots, \gamma_{n-1}^{noise})$$

$$\varphi_n^{smooth} = \varphi_n - \text{mean}(\gamma_{n-size}^{noise}, \varphi_{n-noise+1}^{noise}, \ldots, \varphi_{n-1}^{noise})$$

$$\theta_n^{smooth} = \theta_n - \text{mean}(\theta_{n-size}^{noise}, \theta_{n-noise+1}^{noise}, \ldots, \theta_{n-1}^{noise}) \quad (2)$$

Here, n denotes a frame number, and size stands for the size of a sliding window applied in the mean filtering based smoothing process.

Next, it is possible to acquire a smoothed matrix R on the basis of the smoothed Euler angles as follows.

$$R = R_x(\theta) * R_y(\gamma) * R_z(\varphi) \quad (3)$$

$$= \begin{vmatrix} 1 & 0 & 0 \\ 0 & \cos\theta & -\sin\theta \\ 0 & \sin\theta & \cos\theta \end{vmatrix} * \begin{vmatrix} \cos\gamma & 0 & \sin\gamma \\ 0 & 1 & 0 \\ -\sin\gamma & 0 & \cos\gamma \end{vmatrix} * \begin{vmatrix} \cos\varphi & -\sin\varphi & 0 \\ \sin\varphi & \cos\varphi & 0 \\ 0 & 0 & 1 \end{vmatrix}$$

Subsequently, by performing motion compensation on the first image on the basis of the given homography matrix $R_{origin}$ before smoothing and the smoothed matrix R, a stable first image Stable(img) after compensation may be acquired by the following equation (4).

$$\text{Stable(img)} = R * R_{origin} * \text{Unstable(img)} \quad (4)$$

Here, Unstable(img) refers to the first image before compensation.

In an example, if the first image is a three dimensional video image, then Unstable(img) is a three dimensional image, and the first stable image Stable(img) acquired is also a three dimensional image. Furthermore, after the first stable image is attained, it is also possible to perform coordinate transform on the first stable image so as to procure a two dimensional image transformed.

In another example, if the first image is a two dimensional video image, then it is possible to directly substitute it into the above-described equations so as to produce a first stable image, without carrying out coordinate transform from three dimensions to two dimensions.

As a result, by making use of the video stabilization method according to this embodiment, it is possible to choose a first area from a first image, and conduct feature point matching, motion parameter estimation, and motion compensation on the basis of the first area selected, thereby being able to avoid the excess compensation for a static object in an image due to motion estimation including a moving object in the image and motion compensation for the whole image, so as to improve the output quality of a video.

Second Embodiment

FIG. 5 is a block diagram of a video stabilization apparatus 500 according to this embodiment.

Here it should be noted that the video stabilization apparatus 500 may execute the video stabilization method according to the first embodiment.

As shown in FIG. 5, the video stabilization apparatus 500 includes a selection part 510, a matching part 520, an estimation part 530, and a compensation part 540. Of course, the video stabilization apparatus 500 may further contain other parts; however, because these kinds of parts are not closely related to this embodiment, their illustrations and descriptions are omitted here for the sake of convenience.

In particular, the selection part 510, the matching part 520, the estimation part 530, and the compensation part 540 are configured to conduct STEPS S101 to S104 (shown in FIG. 1) of the video stabilization method according to the first embodiment. Here it should be noted that these steps have been minutely depicted in the video stabilization method according to the first embodiment, i.e., for more information about STEPS S101 to S104, it is possible to see the first embodiment, wherefore the details of these steps are also omitted here for the sake of convenience.

As a result, by taking advantage of the video stabilization apparatus according to this embodiment, it is possible to select a first area from a first image, and perform feature point matching, motion parameter estimation, and motion compensation on the grounds of the first area chosen, thereby being capable of avoiding the excess compensation for a static object in an image due to motion estimation including a moving object in the image and motion compensation for the whole image, so as to make the output quality of a video better.

Third Embodiment

FIG. 6 is a block diagram of another video stabilization apparatus 600 according to this embodiment.

As presented in FIG. 6, the video stabilization apparatus 600 contains at least one processor 610 and a storage 620 connected to the processor 610. Here it should be noted that the video stabilization apparatus 600 may further include other parts; however, these types of parts are not closely relating to this embodiment, ergo their illustrations and descriptions are omitted here for the sake of convenience.

Concretely, the processor 610 may be a CPU (Central Processing Unit) or any other processing part having data processing ability and/or instruction implementing ability, and configured to execute a computer program stored in the storage 620 to accomplish STEPS S101 to S104 of the video stabilization method according to the first embodiment whose details are also omitted in this embodiment for the sake of convenience.

In addition, the storage 610 may be any storage medium for storing processor-readable computer programs, such as a floppy disk, a hard disk, a CD ROM, a magnetic tape device, or a solid state memory device.

Fourth Embodiment

In this embodiment, a computer program and a non-transitory computer-readable medium are given, and briefly described as follows.

The computer program may cause a computer to conduct the video stabilization method in accordance with the first embodiment.

Furthermore, the non-transitory computer-readable medium may store computer-executable instructions (i.e., the computer program) for execution by a computer including a processor(s) or processing system. The computer-executable instructions, when executed, may render the processor(s) or processing system to perform the video stabilization method according to the first embodiment.

Here it should be noted that the embodiments of the present invention may be implemented in any convenient form, for example, using dedicated hardware or a mixture of dedicated hardware and software. The embodiments of the present invention may be implemented as computer software executed by one or more networked processing apparatuses. The network may comprise any conventional terrestrial or wireless communications network, such as the Internet. The processing apparatuses may comprise any suitably programmed apparatuses such as a general-purpose computer, a personal digital assistant, a mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable codes such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by a person skilled in the art without departing from the basic concept and technical scope of the present invention.

The present application is based on and claims the benefit of the priority of Chinese Patent Application No. 201810461379.4 filed on May 15, 2018, the entire contents of which are hereby incorporated by reference.

The invention claimed is:

1. A video stabilization method comprising:
   selecting a first area in a first image;
   determining at least one first feature point based on the first area, and performing feature point matching on the first image and a second image so as to obtain at least one feature point matching pair between the first image and the second image, each feature point matching pair including a first feature point of the first image and a second feature point of the second image;
   conducting motion parameter estimation based on the at least one feature point matching pair so as to obtain a motion parameter; and
   carrying out motion compensation with respect to the first image based on the motion parameter so as to acquire a first stable image after compensation,
   wherein, the selecting a first area in the first image includes
      conducting object detection in regard to the first image so as to obtain at least one detected object, wherein each of the at least one detected object is located in a different first area, and
      choosing at least one first area based on a type of the at least one detected object in said at least one first area being associated to a stationary object, each first area being assigned a weight value, wherein a stationary object in a first area receives a relatively high weight value while a moving object in a first area receives a relatively low weight value, and
   wherein the determining at least one first feature point based on the first area includes
      performing feature point detection on the chosen at least one first area so as to acquire at least one feature point, and
      using the weight values as ratios for selecting one or more feature points in the respective chosen at least one first area.

2. The video stabilization method according to claim 1, wherein,
   the selecting a first area in a first image includes:
      choosing at least one first area containing pixels having a first state in the first image; and
   the determining at least one first feature point based on the first area includes:
      performing feature point detection on the at least one first area so as to obtain at least one feature point serving as the at least one first feature point.

3. The video stabilization method according to claim 2, wherein,
   the first state is a non-motion state including:
      a still state; or
      a state where an instantaneous movement speed of a pixel is less than a predetermined threshold.

4. The video stabilization method according to claim 2, wherein,
   the choosing at least one first area containing pixels having a first state in the first image includes:
      calculating an optical flow value of each pixel in the first image; and
      letting an area in which optical flow values of pixels are less than a predetermined value be the first area.

5. The video stabilization method according to claim 1, wherein,
   the obtaining at least one feature point matching pair between the first image and the second image includes:
      utilizing a motion consistency based approach to remove a mistaken feature point matching pair.

6. The video stabilization method according to claim 1, wherein,
the carrying out motion compensation with respect to the first image based on the motion parameter includes:
performing a smoothing process on the motion parameter by mean filtering so as to acquire a smoothed motion parameter; and
employing the smoothed motion parameter to conduct motion compensation in regard to the first image.

7. The video stabilization method according to claim 1, wherein,
the second image is a neighboring frame of the first image; or
the second image is a reference frame in a video.

8. The video stabilization method according to claim 7, wherein,
if the second image is a neighboring frame of the first image, then the conducting motion parameter estimation based on the at least one feature point matching pair includes:
utilizing the at least one feature point matching pair to estimate a homography matrix of the first image relative to the second image.

9. The video stabilization method according to claim 8, wherein,
if the second image is a neighboring frame of the first image, then the conducting motion parameter estimation based on the at least one feature point matching pair further includes:
employing the homography matrix and relative motion between the second image and the reference frame to estimate a motion parameter between the first image and the reference frame.

10. A video stabilization apparatus comprising:
a storage storing computer-executable instructions; and
a processor connected to the storage,
wherein the computer-executable instructions, when executed, cause the processor to implement the video stabilization method according to claim 1.

11. A non-transitory computer-readable medium storing computer-executable instructions for execution by a processor, wherein,
the computer-executable instructions, when executed, cause the processor to carry out the video stabilization method according to claim 1.

12. A video stabilization apparatus comprising:
a storage configured to store instructions thereon; and
a processor configured to execute the instruction to cause the video stabilization apparatus to
select a first area in a first image,
determine at least one first feature point based on the first area, and perform feature point matching on the first image and a second image so as to obtain at least one feature point matching pair between the first image and the second image, each feature point matching pair including a first feature point of the first image and a second feature point of the second image,
conduct motion parameter estimation based on the at least one feature point matching pair so as to obtain a motion parameter, and
carry out motion compensation with respect to the first image based on the motion parameter so as to acquire a first stable image after compensation,
wherein, the selecting the first area in the first image includes
conducting object detection in regard to the first image so as to obtain at least one detected object, wherein each of the at least one detected object is located in a different first area, and
choosing at least one first area based on a type of the at least one detected object in the chosen at least one first area being associated to a stationary object, each first area being assigned a weight value, wherein a stationary object in a first area receives a relatively high weight value while a moving object in a first area receives a relatively low weight value, and
wherein the determining the at least one first feature point based on the first area includes
performing feature point detection on the chosen at least one first area so as to acquire at least one feature point, and
using the weight values as ratios for selecting one or more feature points in the respective chosen at least one first area.

13. The video stabilization method according to claim 12, wherein,
the selecting a first area in a first image includes choosing at least one first area containing pixels having a first state in the first image, and
the determining at least one first feature point based on the first area includes performing feature point detection on the at least one first area so as to obtain at least one feature point serving as the at least one first feature point.

14. The video stabilization method according to claim 13, wherein,
the first state is a non-motion state includes:
a still state; or
a state where an instantaneous movement speed of a pixel is less than a predetermined threshold.

15. The video stabilization method according to claim 13, wherein,
the choosing at least one first area containing pixels having a first state in the first image includes:
calculating an optical flow value of each pixel in the first image; and
letting an area in which optical flow values of pixels are less than a predetermined value be the first area.

16. The video stabilization method according to claim 12, wherein,
the obtaining at least one feature point matching pair between the first image and the second image includes:
utilizing a motion consistency based approach to remove a mistaken feature point matching pair.

17. The video stabilization method according to claim 12, wherein,
the carrying out motion compensation with respect to the first image based on the motion parameter includes:
performing a smoothing process on the motion parameter by mean filtering so as to acquire a smoothed motion parameter; and
employing the smoothed motion parameter to conduct motion compensation in regard to the first image.

18. The video stabilization method according to claim 12, wherein,
the second image is a neighboring frame of the first image; or
the second image is a reference frame in a video.

19. A Non-transitory computer readable medium on which instructions are stored which when executed by a processor causes the processor to:

select a first area in a first image;

determine at least one first feature point based on the first area, and performing feature point matching on the first image and a second image so as to obtain at least one feature point matching pair between the first image and the second image, each feature point matching pair including a first feature point of the first image and a second feature point of the second image;

conduct motion parameter estimation based on the at least one feature point matching pair so as to obtain a motion parameter; and carry out motion compensation with respect to the first image based on the motion parameter so as to acquire a first stable image after compensation, wherein, the selecting a first area in the first image includes conducting object detection in regard to the first image so as to obtain at least one detected object, wherein each of the at least one detected object is located in a different first area, and choosing at least one first area based on a type of the at least one detected object in said at least one first area being associated to a stationary object, each first area being assigned a weight value, wherein a stationary object in a first area receives a relatively high weight value while a moving object in a first area receives a relatively low weight value, and wherein the determining at least one first feature point based on the first area includes performing feature point detection on the chosen at least one first area so as to acquire at least one feature point, and using the weight values as ratios for selecting one or more feature points in the respective chosen at least one first area.

* * * * *